US 6,381,280 B1

(12) United States Patent
Lynch et al.

(10) Patent No.: US 6,381,280 B1
(45) Date of Patent: Apr. 30, 2002

(54) SINGLE CHIP MOTION WAVELET ZERO TREE CODEC FOR IMAGE AND VIDEO COMPRESSION

(75) Inventors: William C. Lynch, Palo Alto; Krasimir D. Kolarov, Menlo Park; D. Robert Hoover, Cupertino; William J. Arrighi, El Cerrito, all of CA (US)

(73) Assignee: Interval Research Corporation, Palo Alto, CA (US)

( * ) Notice: Subject to any disclaimer, the term of this patent is extended or adjusted under 35 U.S.C. 154(b) by 0 days.

(21) Appl. No.: 09/087,449

(22) Filed: May 29, 1998

Related U.S. Application Data

(60) Provisional application No. 60/050,933, filed on May 30, 1997.

(51) Int. Cl.[7] ................................................. H04N 7/12

(52) U.S. Cl. .................................................. 375/240.19

(58) Field of Search ................................. 382/240, 248; 364/724.04, 724.14, 725.01, 725.02, 725.05; 375/240.18, 240.19; 348/398.1; H04N 7/12

(56) References Cited

U.S. PATENT DOCUMENTS

| 4,155,097 A | 5/1979 | Lux ........................... 358/135 |
| 4,190,861 A | 2/1980 | Lux ........................... 358/135 |
| 5,014,134 A | 5/1991 | Lawton et al. ........... 358/261.3 |

(List continued on next page.)

FOREIGN PATENT DOCUMENTS

| GB | 2302245 | 1/1997 |
| WO | WO93/17524 | 9/1993 |
| WO | WO94/17492 | 8/1994 |
| WO | WO97/16021 | 5/1997 |

OTHER PUBLICATIONS

EPO; International Search Report, PCT/US 98/11059; Aug. 21, 1998.
Krasimir Kolarov, William Lynch; Compression of Functions Defined On Surfaces of 3D Objects; 1997; IEEE.
A.S. Lewis, G. Knowles; A 64 Kb/s Video Codec using the 2–D Wavelet Transform; 1991; IEEE DCC '91 Data Compression Conference.
Amir Said and William A. Pearlman; Image Compression Using the Spatial–Orientation Tree; 1993; IEEE.
Amir Said and William A. Pearlman; An Image Multiresolution Representation for Lossless and Lossy Compression; Nov. 1993; SPIE Symposium on Visual Communications and Image Processing, Cambridge, MA.
Amir Said and William A. Pearlman; A New Fast and Efficient Image Codec Based on Set Partitioning in Hierarchical Trees; May 1993; IEEE Int. Symp. on Circuits and Systems, Chicago, IL.
Jerome M. Shaprio; Embedded Image Coding Using Zerotrees of Wavelet Coefficients; Dec. 1993; IEEE Transactions on Signal Processing, vol. 41, No. 12.

(List continued on next page.)

Primary Examiner—Nhon T. Diep
(74) Attorney, Agent, or Firm—Beyer Weaver & Thomas, LLP

(57) ABSTRACT

A motion wavelet transform zero tree codec achieves high compression and is implemented in hardware of modest size and at very low cost. A wavelet transform is combined with a tree walk technique for encoding the resulting wavelet coefficients. A 2–6 wavelet transform is used. Wavelet coefficients from the transform are represented in a pyramid of wavelet coefficients. An array of zero trees are formed from the pyramid to hold the wavelet coefficients, one coefficient to each node. Significance values for each node are calculated to assist with the tree walk and encoding. Each zero tree is traversed to produce an output of encoded bits. Encoded bits are output directly during the tree walk.

23 Claims, 11 Drawing Sheets

U.S. PATENT DOCUMENTS

| | | | |
|---|---|---|---|
| 5,068,911 A | | 11/1991 | Resnikoff et al. ............. 382/56 |
| 5,101,446 A | | 3/1992 | Resnikoff et al. ............. 382/56 |
| 5,124,930 A | | 6/1992 | Nicolas et al. .............. 364/485 |
| 5,148,498 A | | 9/1992 | Resnikoff et al. ............. 382/54 |
| 5,262,958 A | | 11/1993 | Chui et al. .................. 364/487 |
| 5,272,478 A | | 12/1993 | Allen ......................... 341/107 |
| 5,287,529 A | | 2/1994 | Pentland .................... 395/800 |
| 5,315,670 A | | 5/1994 | Shapiro ....................... 382/56 |
| 5,321,776 A | | 6/1994 | Shapiro ....................... 382/56 |
| 5,359,627 A | | 10/1994 | Resnikoff .................... 375/34 |
| 5,363,099 A | | 11/1994 | Allen ......................... 341/107 |
| 5,381,145 A | | 1/1995 | Allen et al. ................. 341/107 |
| 5,384,725 A | | 1/1995 | Coifman et al. ............ 364/807 |
| 5,412,741 A | | 5/1995 | Shapiro ..................... 382/232 |
| 5,414,780 A | | 5/1995 | Carnahan ................... 382/276 |
| 5,477,272 A | * | 12/1995 | Zhang et al. .......... 375/240.06 |
| 6,125,201 A | * | 9/2000 | Zador ........................ 382/166 |
| 6,144,773 A | * | 11/2000 | Kolarov et al. ............. 382/240 |

OTHER PUBLICATIONS

Edward L. Schwartz, Ahmad Zandi, Martin Boliek; Implementation of Compression with Reversible Embedded Wavelets; Jul. 11, 1995; Proceedings of the SPIE 40th Annual Meeting, vol. 2564–04.

A.S. Lewis and G. Knowles; Image Compression Using the 2–D Wavelet Transform; Apr. 1992; IEEE Transactions on Image Processing, vol. 1, No. 2.

"Low Cost Multiformat Video Codec", 1997, Analog Devices ADV601 Rev. 0.

"Crew Summary", May 1998, RICOH Website at www.cr-c.ricoh.com.

Boliek et al., "Crew Lossless/Lossy Image Compression", Jun. 1995, WGI Meeting in France, ISO/IEC JTC I/S C29/WG 1 N196.

* cited by examiner

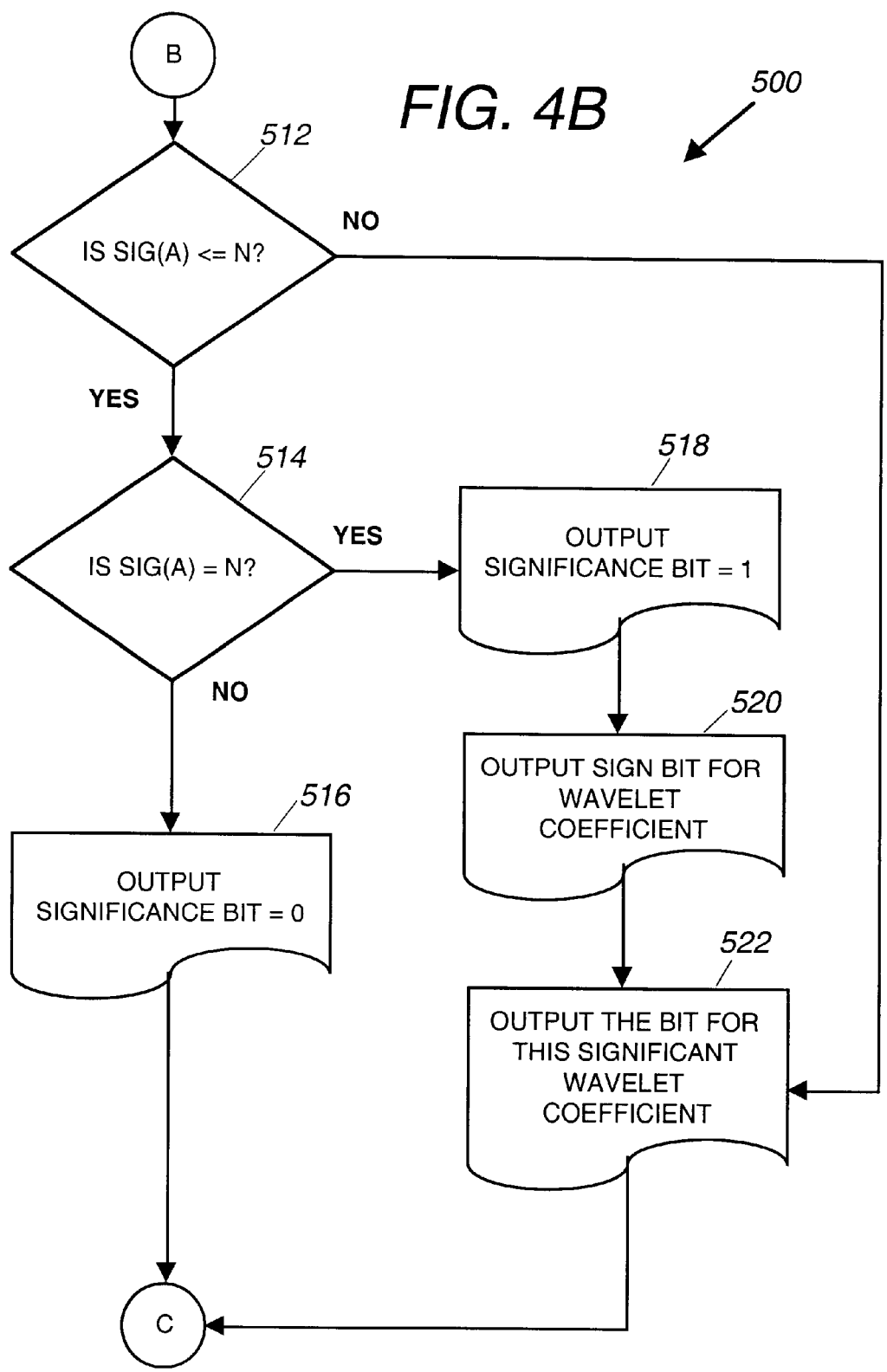

SINGLE CHIP MOTION WAVELET ZERO TREE CODEC FOR IMAGE AND VIDEO COMPRESSION

This application claims priority of U.S. provisional patent application No. 60/050,933, filed May 30, 1997, entitled "Single Chip Motion Wavelet Zero Tree Codec For Image And Video Compression" by Inventors Lynch et al., which is hereby incorporated by reference.

FIELD OF THE INVENTION

The present invention relates generally to compression and decompression of data. More specifically, the present invention relates to a motion wavelet transform zero tree codec for compression of images and video.

BACKGROUND OF THE INVENTION

A number of important applications in image processing require a very low cost, fast and good quality video codec (coder/decoder) implementation that achieves a good compression ratio. In particular, a low cost and fast implementation is desirable for low bit rate video applications such as video cassette recorders (VCRs), cable television, cameras, set-top boxes and other consumer devices. In particular, it is often desirable for such a codec to be implemented on a low-cost, relatively small, single integrated circuit.

Recent notable advances in the field of compression have been made by a variety of institutions. For example, RICOH Corporation has recently introduced the continuous-tone still image compression technology called "Compression With Reversible Embedded Wavelets" (CREW). CREW is a unified lossless and lossy continuous-tone still image compression system based on a lossless (reversible) wavelet transform and has embedded quantization. The CREW technology uses TS-transform filters to perform the wavelet transform. These TS-transform filters are based upon the well known 2–6 Biorthogonal filters. For encoding after the transform, the CREW technology uses one of three possible adaptive binary entropy coders: the Finite State Machine (FSM) Coder, the QM-Coder, and the high-speed parallel coder.

The use of reversible wavelet transforms, embedded code stream and a high-speed high-compression binary entropy coder combine to make the CREW technology ideal for a number of high end image compression applications. These applications include medical imagery, pre-press images, continuous tone facsimile documents, image archival, world wide web images and satellite imagery. Many of these applications have not used compression in the past, either because the quality could not assured, the compression rate was not high enough, or the data rate was not controllable. Thus, the CREW technology provides very high quality, high compression rate data compression for these high end image compression applications. However, it is not clear that the CREW technology is especially suited for extremely low cost, good quality, real-time video codec implementations that only need a relatively good compression ratio. In particular, it is not clear that the CREW technology is especially suitable for low cost and fast implementations for low bit-rate applications in consumer devices.

There are hardware devices implemented on a single chip that do provide real time compression and decompression of video images. For example, the ADV601 device available from Analog Devices, Inc., of Norwood, Mass., is a low cost, single chip CMOS VLSI device for real time compression and decompression of interlaced digital video. To perform a wavelet transform on incoming data, the ADV601 is based on the 7–9 Biorthogonal wavelet transform (Daubechies wavelets). For encoding, the ADV601 uses well-known Huffman coding.

Unfortunately, the ADV601 can be slow to process data and can be expensive to implement in both hardware and software due to the multiplications required. For example, the Daubechies wavelets require, on the average, six multiplications per wavelet coefficient for both encoding and decoding. For a typical image of size 640×480 pixels, there are 307,200 wavelet coefficients i.e., about 1.85 million multiplications per image. For video this number can be even higher. For example, at 30 frames per second 55 million multiplications per second must be performed for both encoding and decoding. The sheer number of these multiplications means the processing is slower, especially for real time video images, and means that a hardware implementation is much more expensive.

Continuing with a discussion of compression in general, it is noted that transform-based compression of data typically involves the steps of transformation, quantization and encoding. Bit encoding may be performed using a wide variety of techniques.

A bit encoding technique known as the zerotree algorithm has been used in the past to encode classical wavelets. The zerotree algorithm for encoding wavelet coefficients was first introduced by J. M. Shapiro in "Embedded Image Coding Using Zerotrees of Wavelet Coefficients," 41(12): 34453462, IEEE Trans. Signal Process, 1993. The technique has been extended recently by A. Said and W. A. Pearlman in the manuscript "A New Fast and Efficient Image Codec Based on Set Partitioning in Hierarchical Trees", submitted to the IEEE Transactions on Circuits and Systems for Video Technology. A further explanation of this technique can also be found in "Image Compression Using the Spatial-Orientation Tree", A. Said and W. Pearlman, IEEE Report 0-7803-1254-6/93, 1993. Each of these publications is incorporated herein by reference. The encoding technique of Said-Pearlman relies on the fact that in smooth regions of images the coefficients decay exponentially. This implies that if a certain coefficient is below a threshold then its children are very likely to be below the threshold as well. Thus, a whole subtree of small coefficients below the sub-threshold coefficient may be discarded.

The Said-Pearlman zerotree algorithm uses lists and sets to facilitate its implementation. There is a list of insignificant sets (LIS), a list of insignificant nodes (LIN), and a list of significant nodes (LSN). A set O represents all children of a node, a set D represents all descendants of a node, and a set L represents all grandchildren of a node and below. Initially, the lists LIS and LIN are initialized to contain top level nodes. The list LSN is initialized to the empty list. The Said-Pearlman zerotree algorithm relies heavily upon list processing and the shifting of nodes back and forth between lists and sets. Although this technique of list processing and shuffling can be implemented for fast execution in software, it is not a desirable solution for hardware implementation. For one, such an implementation uses a great deal of memory and hardware. Secondly, the complex accessing pattern relied upon by this list processing requires not only more memory and associated hardware, but the algorithm is slower when implemented in hardware. Thus, use of the Said-Pearlman zerotree algorithm is not particularly desirable for a hardware implementation of a compression device.

For example, it is not apparent that prior art techniques have made use of a zerotree in the implementation of a video codec implemented in hardware. For example, neither the CREW technology nor the ADV601 device make use of zero trees. Use of a modified zerotree in combination with second generation wavelets is discussed in the commonly assigned, pending U.S. patent application Ser. No. 08/607,388 filed Feb. 27, 1996, by inventors Kolarov et al., entitled "Wavelet-Based Data Compression" which provides an efficient technique for compression and decompression of functions defined upon three-dimensional surfaces.

Therefore, a compression technique for video and image compression is desirable which may be implemented in hardware of modest size and very low cost. It would be further desirable for such a compression technique to take advantage of the benefits provided by zerotree encoding.

SUMMARY OF THE INVENTION

To achieve the forgoing, and in accordance with the purpose of the present invention, a motion wavelet transform zero tree codec is disclosed that achieves high compression ratios and may be implemented in hardware of modest size and at very low cost. In particular, embodiments of the present invention are well-suited for fast, real-time video compression.

One aspect of the present invention combines a wavelet transform with a novel tree walk technique for encoding the resulting wavelet coefficients, thus providing a very low cost, fast and good quality video codec implementation. In one particular embodiment, the present invention uses the 2–6 wavelet transform to provide a cheaper implementation in hardware. In a further embodiment, wavelet coefficients from the transform are represented in an array of zero trees which are traversed to produce an output of encoded bits.

The present invention outperforms the ADV601 video encoder/decoder device. Performance is improved by using shorter and less computationally intensive filters than those used in the ADV601. For example, while the ADV601 uses the 7–9 wavelet transform which requires multiplications, an embodiment of the present invention using 2–6 wavelet transforms needs no multiplications in the transform implementation. Such an implementation means fewer additions, and thus the overall method is significantly cheaper for software and in particular for a hardware implementation. Furthermore, an embodiment of the present invention traverses a zero tree in a novel fashion, allowing encoded bits to be output directly during the tree walk and avoiding complex and time consuming list processing and shuffling. Unlike the traditional zero tree algorithm which uses shuffling of nodes and coefficients between sets and lists, the present invention performs a direct tree walk of the zero trees produced which means a more efficient and cheaper hardware implementation. The present invention is especially suited for implementation upon a single integrated circuit.

In addition, the present invention produces better peak signal to noise ratios (PSNR) for a variety of different images and video. Experimentation with images from the test suite for the ADV601, as well as with the video sequences used for evaluation of the MPEG4 proposals, reveal that the present invention outperforms the ADV601 significantly both in PSNR and perceptually.

An aspect of the present invention is able to transform fields of pixels independently which greatly reduces the complexity of the compression and reduces the amount of RAM needed. In a specific implementation of this embodiment, a two-degree quadratic approximation is drawn through edge points on a field and is assumed to continue across field boundaries. An improved 2–6 Biorthogonal filter is used to filter information in successive passes by providing specific numerical values for the initial and final lifted differences ($w_0$ and $w_{n-1}$) rather than simply assigning zero values for their coefficients as is done in the prior art. Assigning specific numerical values for the lifted difference values at the field boundaries allows each field to be treated independently yet still reduces blocking artifacts that would normally occur when an image is decompressed.

The present invention is useful with a variety of types of images, such as those intended for computer monitors, televisions, cameras, hand-held devices etc., and is applicable to a wide variety of standards such as NTSC video, PAL and SECAM television etc.

BRIEF DESCRIPTION OF THE DRAWINGS

The invention, together with further advantages thereof, may best be understood by reference to the following description taken in conjunction with the accompanying drawings in which:

FIGS. 4A–4D are a flowchart illustrating an embodiment of a procedure useful for encoding and outputting the wavelet coefficients in one of the array of zero trees.

DETAILED DESCRIPTION OF THE INVENTION

The various embodiments of the present invention are suitable for implementation independently or in combination in a wide variety of forms. By way of example, the present invention is suitable for implementation in software such as in C++ or any other suitable computer language. The description below is optimized for an eventual hardware implementation, although other software implementations are possible.

The present invention may also be implemented in hardware in standard integrated circuits, in custom integrated circuits such as ASICs, or in a programmable logic device such as an FPGA, a PAL, or a PLA. In one specific implementation of the present invention, implementation on a Xylinx FPGA is used to develop VHDL code. This VHDL code (or more specifically, a macro) can then be combined with other VHDL code to produce a custom integrated circuit useful for placement into a product such as a video camera. Such an implementation on a custom integrated circuit allows for good compression on a relatively small area of silicon. It should be appreciated that the present invention may also be embodied in a wide variety of other hardware description languages.

The present invention is applicable to composite video signals, as well as other combined signals such as S video, and to separate signals such as component video. Also, although the term "video" is used frequently, it should be appreciated that the present invention is applicable to still images as well as video images, and is also applicable to higher dimension information streams. The term "video" as used herein applies not only to traditional video information, but also to these other types of images and information.

Figure 1:
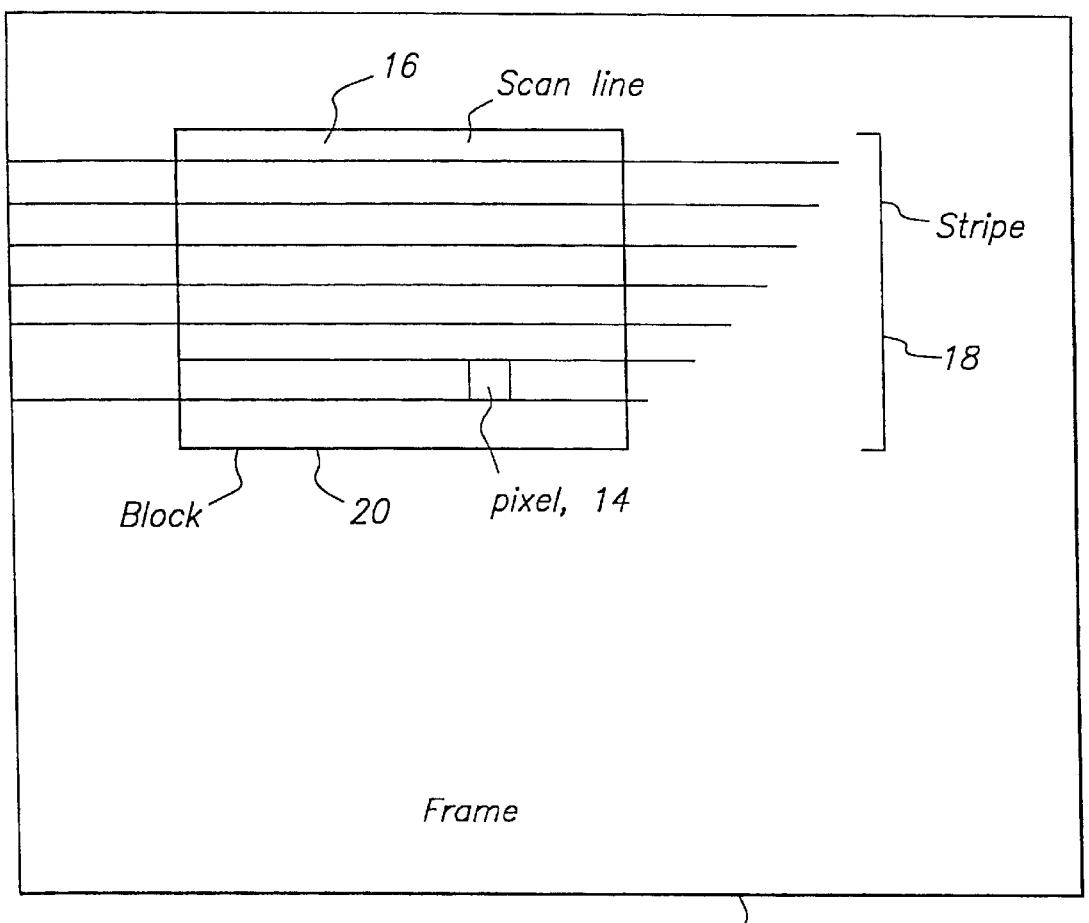
FIG. 1 illustrates a prior art image representation scheme that uses pixels, scan lines, stripes and blocks.

FIG. 1 illustrates a prior art image representation scheme that uses pixels, scan lines, stripes and blocks. Frame 12 represents a still image produced from any of a variety of sources such as a video camera, a television, a computer monitor etc. In an imaging system where progressive scan is used each image 12 is a frame. In systems where interlaced scan is used, each image 12 represents a field of information. Image 12 may also represent other breakdowns of a still image depending upon the type of scanning being used. Information in frame 12 is represented by any number of pixels 14. Each pixel in turn represents digitized information and is often represented by 8 bits, although each pixel may be represented by any number of bits.

Each scan line 16 includes any number of pixels 14, thereby representing a horizontal line of information within frame 12. A block of information 20 is typically one stripe high by a certain number of pixels wide. For example, depending upon the standard being used, a block may be 8×8 pixels, 8×32 pixels, or any other in size. In this fashion, an image may be broken down into blocks and these blocks are then transmitted, compressed, processed or otherwise manipulated depending upon the application. Frames, fields, stripes and/or other breakdowns may be likewise transmitted, compressed, and processed. In NTSC video (a television standard using interlaced scan), for example, a field of information appears every 60th of a second, a frame (including 2 fields) appears every 30th of a second and the continuous presentation of frames of information produce a picture. On a computer monitor using progressive scan, a frame of information is refreshed on the screen every 30th of a second to produce the display seen by a user.

HIGH LEVEL BLOCK DIAGRAM

It is noted that representation of wavelet coefficients in a zero tree has advantages in that subtrees of unneeded coefficients may be discarded for more efficient encoding. It is further noted that current techniques for encoding zero trees of wavelet coefficient rely heavily on list processing (such as the Said-Pearlman algorithm discussed above) and are inappropriate for hardware implementation. It is then realized that encoding of wavelet coefficients represented in a zero tree can be achieved by walking the zero tree in place, and encoding and outputting bits of coefficients as the tree walk occurs. In this fashion, lists and sets are discarded with, and the attendant list processing and shuffling of nodes back and forth may be dispensed with. In other words, once wavelet coefficients are represented in a zero tree, the tree may be walked using a novel technique to encode the coefficients at each node. Bits are output as the tree is walked for an extremely efficient algorithm. Because list processing is not used, a hardware implementation is much simpler and less costly. Hardware implementation on a single integrated circuit is made especially possible because the present invention uses simple comparisons (as opposed to multiplications), shifting, etc., that are more easily implemented in hardware. Less space is required and computations are faster. This is to be contrasted with a Said-Pearlman zerotree algorithm that requires list shuffling and maintenance of numerous stacks, all requiring a larger and more complex hardware implementation.

Figure 2:
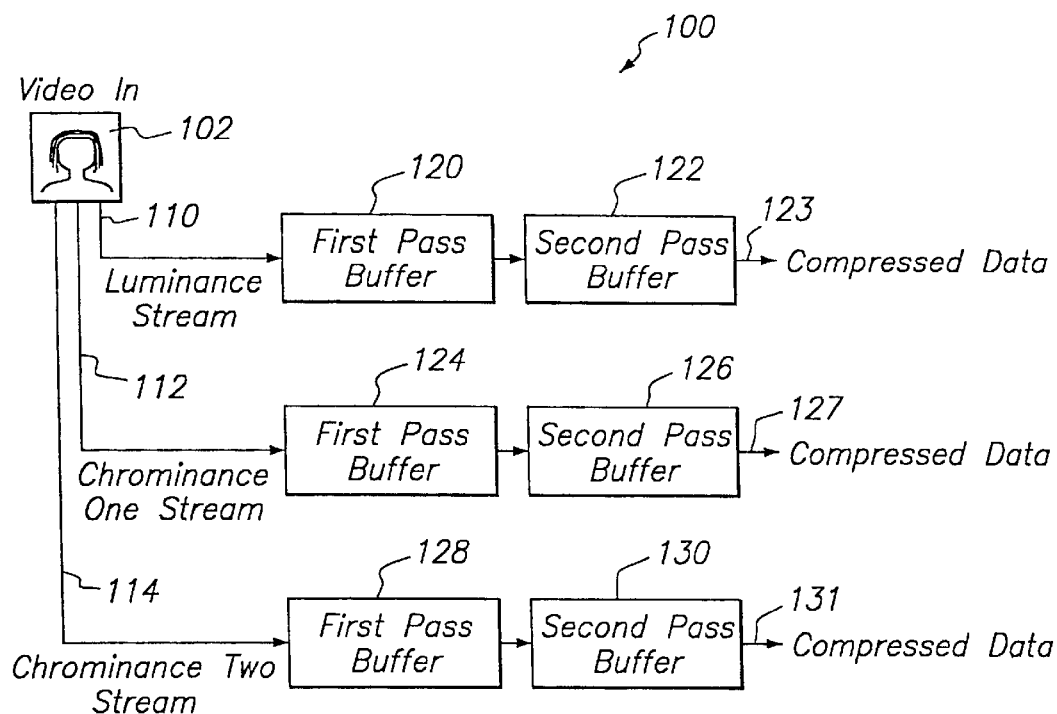
FIG. 2 illustrates a system for compressing a video image according to one embodiment of the present invention.

FIG. 2 illustrates a system 100 for compressing a video image according to one embodiment of the present invention. Details of how each pass of system 100 operate are provided below in the flowcharts of FIGS. 3, 4A–4D, and 5. The following discussion uses compression of a video image for illustrative purposes; it should be appreciated that the present invention is suitable for compressing any of a variety of images containing information, and is not limited to video images. Also, for ease of explanation, FIG. 2 and the following figures discuss compression of an image represented in interlaced scan where each image, or frame, contains two fields. However, those of skill in the art will appreciate that the invention is equally applicable to progressive scan (a field is a frame), or to other standards where many fields may represent a frame. Furthermore, the following description discusses manipulation of pixels, scan lines, stripes and blocks. It should be appreciated that other arbitrary designations for representing hierarchies of information may also be used without departing from the scope of the present invention.

System 100 shows an image of a gentleman 102 that is to be compressed using the present invention. Image 102 may be in black and white or in color, and may be received by system 100 as either an analog or digital signal. Preferably, image 102 is received as an analog signal and is digitized and then represented by pixels of information.

For illustrative purposes, image 102 is a color image, although image 102 may be a simple black and white image as well. Thus, pixels within a field of image 102 have a black and white intensity value, as well as a first chrominance value and a second chrominance value. Accordingly, each field of image 102 results in a luminance stream 110 of pixel values, a first chrominance stream 112 of pixel values, and a second chrominance stream 114 of pixel values. Luminance stream 110 is processed a field at a time in first pass buffer 120 and then second pass buffer 122 before being output as stream 123 of compressed data. Chrominance stream 112 is also processed a field at a time in first pass buffer 124 and then second pass buffer 126 before being output as stream 127 of compressed data. Chrominance stream 114 is processed a field at a time in first pass buffer 128 and then second pass buffer 130 before being output as stream 131 of compressed data. The first pass for each stream transforms and quantizes the data, while the second pass encodes the wavelet coefficients produced by the transform. Procedures illustrating examples of how these first and second passes are performed will be described below.

It should be appreciated that streams 110, 112, and 114 need not necessarily be processed a field at a time, but may also be processed in units of frames, blocks, strips, or other groups of information. First pass buffers 120, 124, and 128 may be implemented in software or hardware using any suitable data structure or hardware implementation. Second pass buffers 122, 126, and 130 may likewise be implemented in any suitable fashion. For illustrative purposes, only the processing of luminance stream 110 will be described below, although one of skill in the art will appreciate that chrominance streams 112 and 114 may be processed in a similar fashion.

FIRST PASS

Figure 6:
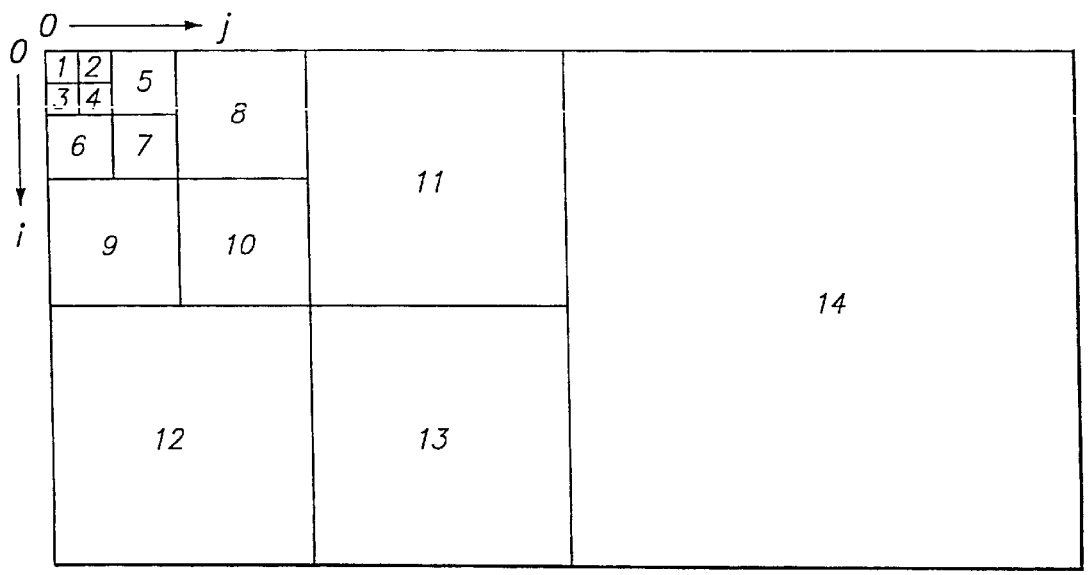
FIG. 6 illustrates a transform pyramid of wavelet coefficients in numerous subbands.
Figure 3:
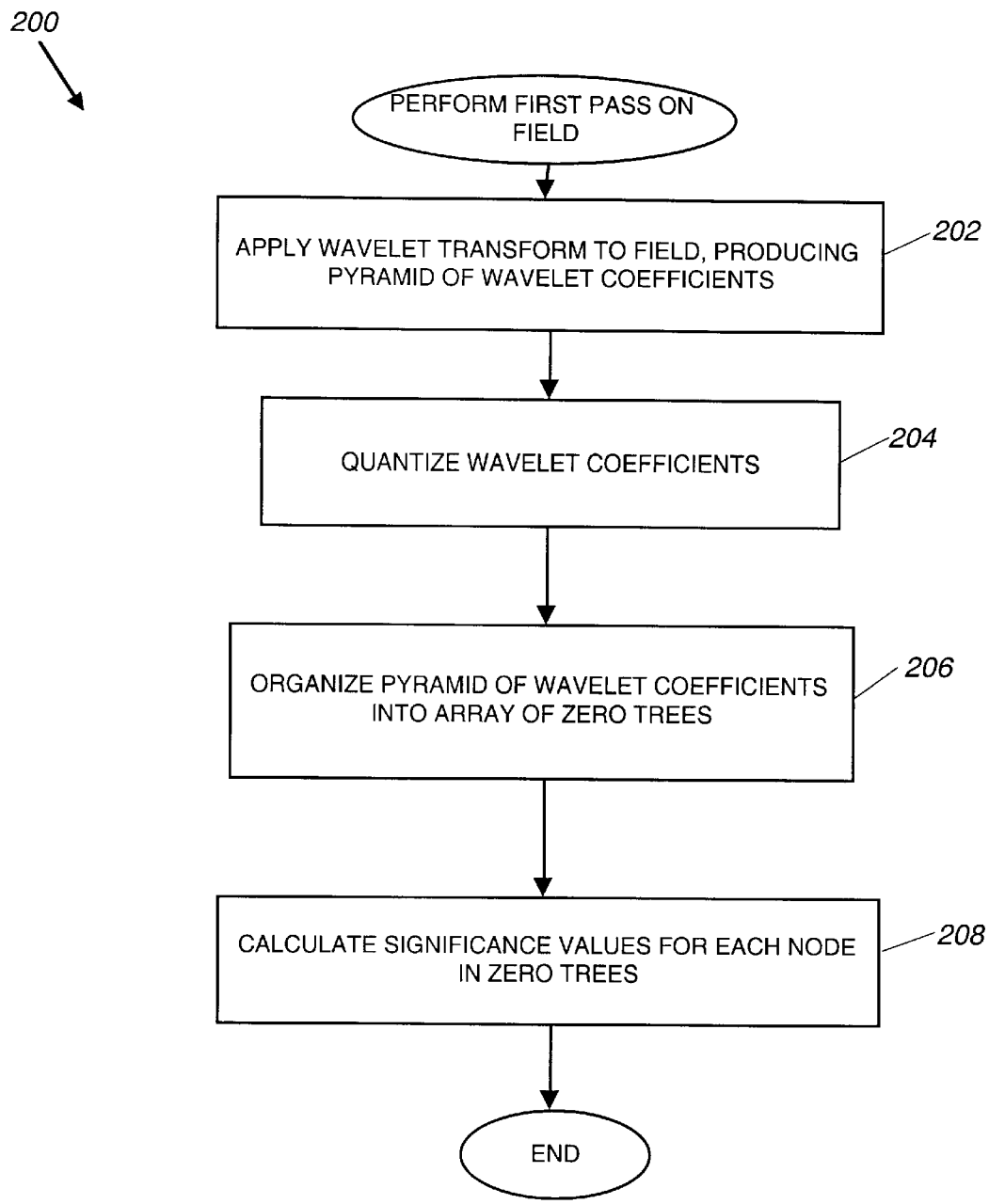
FIG. 3 is a flowchart illustrating a procedure for performing the first pass on a field of an image.
Figure 4A:
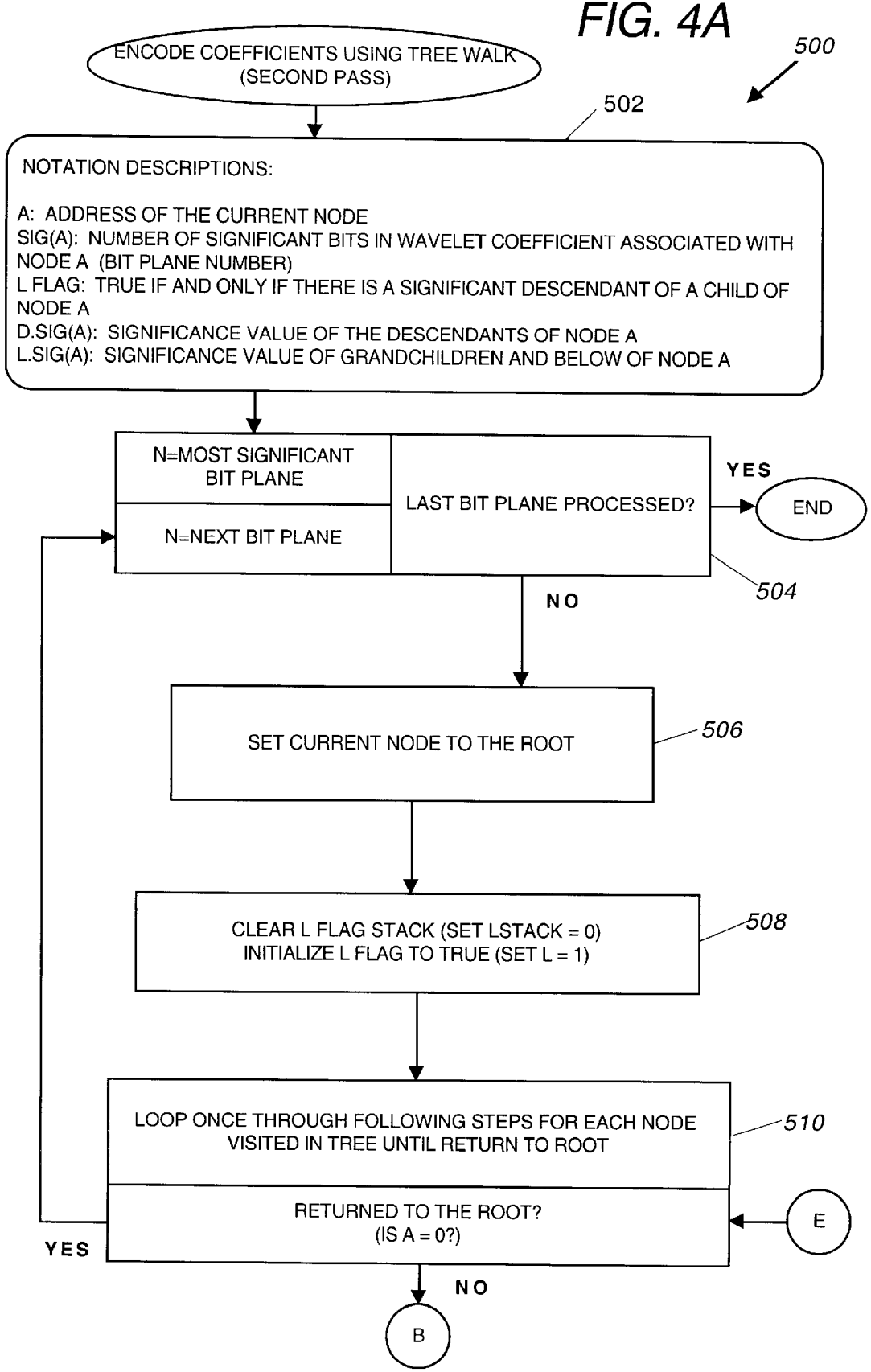
Figure 4C:
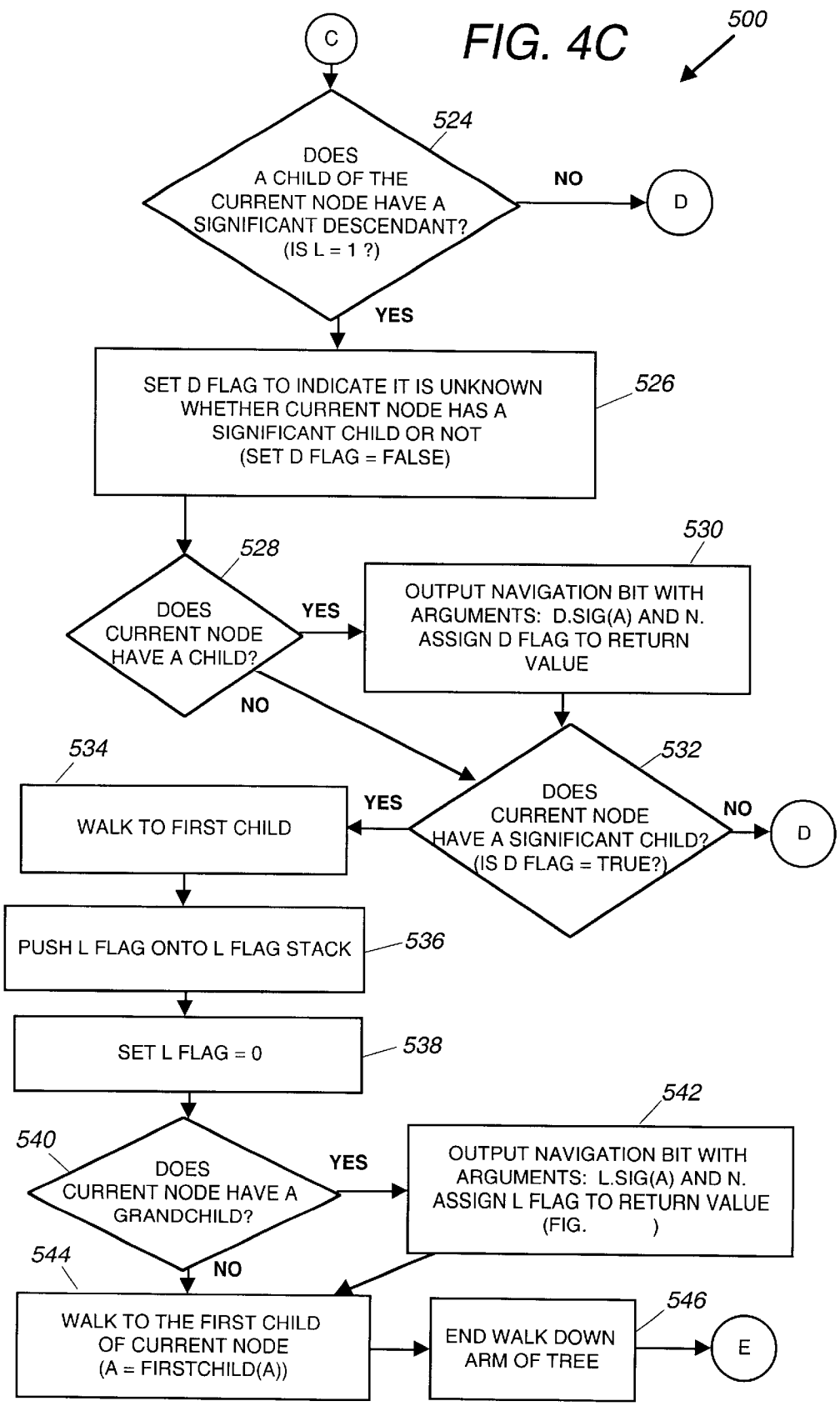
Figure 4D:
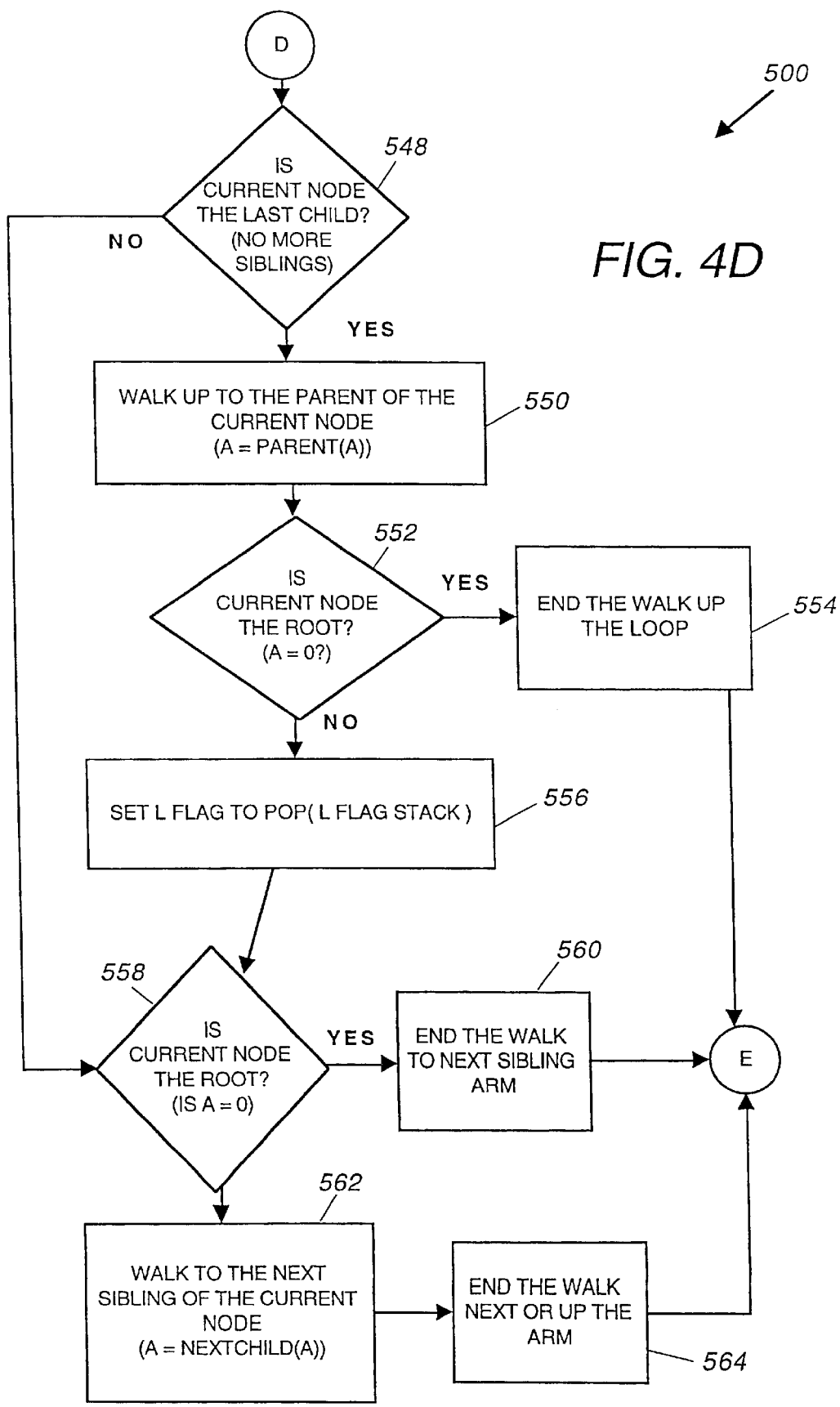

FIG. 3 is a flowchart illustrating a procedure 200 for performing the first pass on a field of an image. Procedure 200 will be explained with reference to FIGS. 6–11. In step 202 a wavelet transform is applied to the field to produce a pyramid of wavelet coefficients. Step 202 may be implemented using any suitable pyramid wavelet transform. By way of example, in one specific embodiment of the invention, a Mallat pyramid 600 as shown in FIG. 6 is constructed for a field having a size of 240×640 pixels. Mallat pyramids are known in the art, and their construction will be appreciated by those of skill in the art. Pyramid 600 is a pyramid of wavelet coefficients in 14 subbands, numbered form 1 to 14 as shown.

In this example, a sequence of vertical and horizontal filters are used to construct a low pass and a high pass transform (i.e., H, L), each of which is down-sampled by a factor of two to produce the same number of output coefficients as input coefficients. In two dimensions, one application of the horizontal filters and of the vertical filters yields four bands (i.e., HH, HL, LH, and LL) each one quarter of the size. The Mallat pyramid is formed by repeating the process on the LL quadrant only.

Although a pyramid of wavelet coefficients may be formed using a sequence of a variety of filters, preferably Mallat pyramid 600 is constructed from five filter applications in the horizontal direction and four applications in the vertical direction. For a 240×640 field, this results in 14 wavelet sub-bands as shown in FIG. 6. The pyramid rows are indexed (by i) from top to bottom, with the top row having an index of zero. Likewise, the pyramid columns are indexed (by j) from left to right with the left column having an index of zero.

Because filters are generally longer than two coefficients, the calculation of transform values near the boundary of the image would normally require image values outside the actual image itself. At higher levels of the pyramid, these values become exponentially farther beyond the image itself. Even in the interior of the image, filters longer than two coefficients imply looking ahead values a distance that is exponentially increasing with the pyramid level.

Although a variety of filters may be used with the present invention, in one specific embodiment the present invention uses an improved version of the 2–6 Bi-orthogonal wavelet transform so as to utilize image values from within the field only. The 2–6 Bi-orthogonal transform is very effective for images, has very short filters, has coefficients that are dyadic rationals with small numerators, and has an effective two-stage factoring (i.e. lifting). Advantageously, an improved version of the 2–6 Bi-orthogonal wavelet transform is used that does not require image values outside the actual image itself; an example of an implementation of such an improved filter is discussed below with reference to FIGS. 7 and 8. A discussion of the use of these improved filters is also described in commonly assigned, pending U.S. patent application Ser. Nos. 09/079,101, 09/079,104, 09/079,049, and 09/079,427 (Attorney Docket Nos. INT1P017, INT1P022, INT1P023 and INT1P024 respectively), which are hereby incorporated by reference.

Once a pyramid of wavelet coefficients has been produced using any suitable pyramid wavelet transform, the wavelet coefficients are then quantized in step 204. Quantization of the wavelet coefficients may be performed using any suitable technique, or need not be performed at all. In a preferred embodiment of the invention, quantization is performed by dividing by a power of two (i.e., by shifting each wavelet coefficient to the right). To minimize and L(2) norm, the transform coefficients should be divided by two for each factor of two finer in scale. To minimize an L(1) norm, the transformed coefficients should be divided by four for each factor of two in scale.

Figure 9:
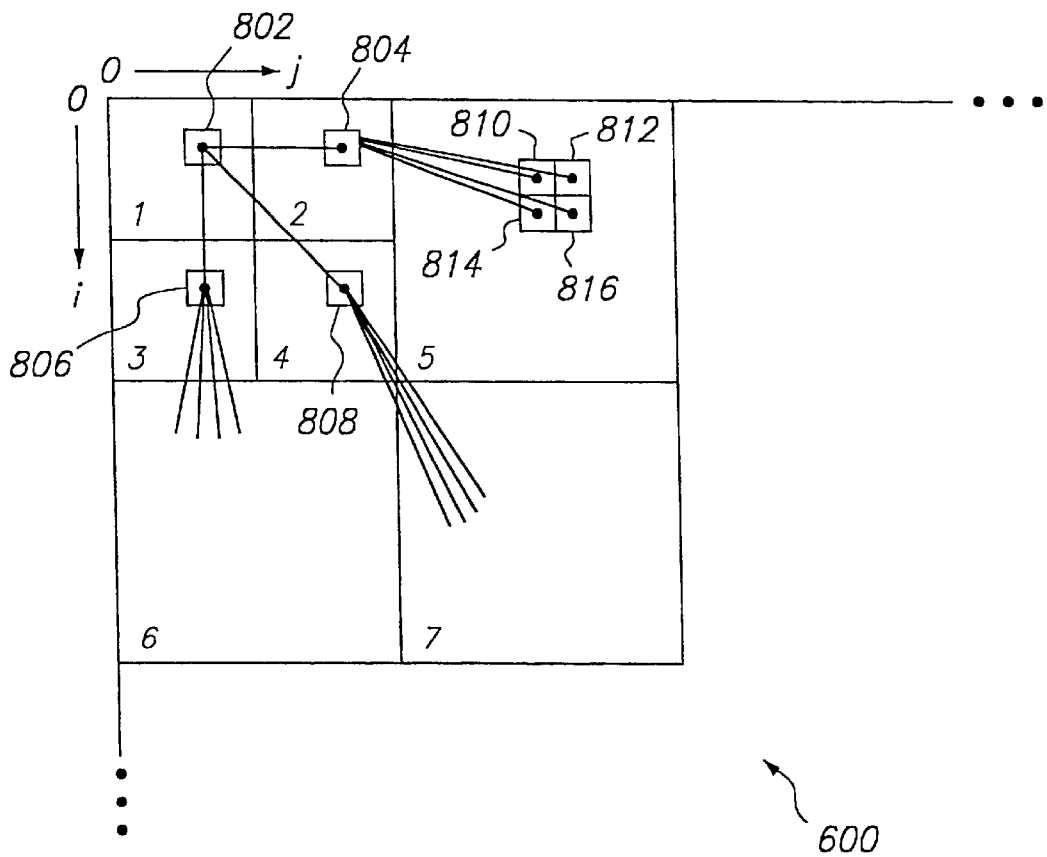
FIG. 9 illustrates a transform pyramid of wavelet coefficients showing how individual wavelet coefficients from various of the sub-bands may be organized into any number of zero trees.
Figure 10:
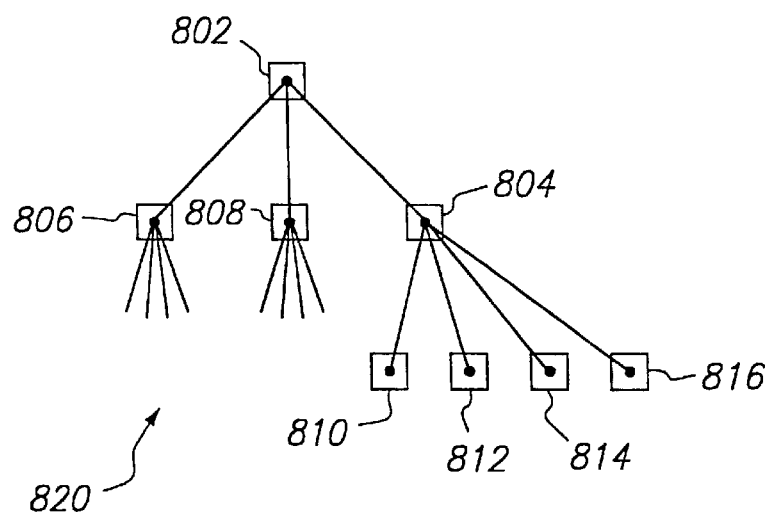
FIG. 10 illustrates a zero tree formed from wavelet coefficients in the transform pyramid.

In step 206 pyramid 600 of wavelet coefficients is organized into a number of zero trees as illustrated in FIGS. 9 and 10. Pyramid 600 may be represented, organized or otherwise transformed into a zero tree or any number of zero trees using any suitable technique. By way of example, FIGS. 9 and 10 illustrate one example of how pyramid 600 is organized into an array of zero trees. FIG. 9 illustrates wavelet coefficient pyramid 600 showing how individual wavelet coefficients from various of the sub-bands may be organized into any number of zero trees. FIG. 10 illustrates a zero tree 820 formed from wavelet coefficients in pyramid 600.

By way of illustration one particular zero tree will be described, although it should be apparent that any number of zero trees rooted in sub-band 1 may be formed. In this embodiment, the root of each zero tree is in sub-band 1 and branches down to the right. A wavelet coefficient from pyramid 600 is associated with each node of the zero tree. A method for forming each zero tree uses the following algorithm. Coefficients in sub-bands 12, 13 and 14 (on the right and bottom edges of pyramid 600) have no children. A coefficient u(i,j) in bands 2–11 has four children, namely u(2i, 2j), u(2i, 2j+1), u(2i+1, 2j), and u(2i+1, 2j+1). A coefficient u(i,j) in band 1 has three children, namely u(i+15,j), u(i,j+20), and u(i+15,j+20). Note that the offsets of 15 and 20 for the three children of the coefficient in band 1 are offsets in particular for a field having a size of 240×640 and that any other suitable offset may be used with fields and or blocks having different sizes.

Thus, a given wavelet coefficient 802 in sub-band 1 has three children in sub-bands 2, 3 and 4, respectively. Each of these children has four children in sub-bands 5, 6 and 7 as shown. More specifically, wavelet coefficient 802 has three children, namely coefficients 804, 806, and 808. Coefficient 804 has four children in sub-band 5, namely coefficients 810, 812, 814 and 816. Coefficients 806 and 808 each have four wavelet coefficient children in sub-bands 6 and 7, respectively (not shown), as determined by the algorithm described above. In turn, each of coefficients 810–816 will have four children in sub-band 8, and so on.

FIG. 10 illustrates in greater detail zero tree 820 formed from pyramid 600. Not shown for clarity are the subtrees branching from coefficients 806 and 808, and the subtrees from coefficients 810–816. Thus, an array of zero trees may be organized from pyramid 600 each having a root in sub-band 1.

Figure 11:
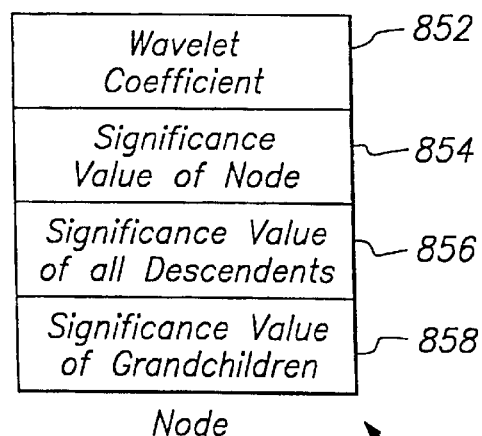
FIG. 11 illustrates values associated with a given node in a zero tree.

Step 208 calculates three significance values for each node in each of the zero trees. FIG. 11 illustrates the values associated with a given node in a zero tree. As described above, a wavelet coefficient 852 is associated with each node. The significance value for each node 854 is a number that indicates the number of significant bits in the wavelet coefficient 852 associated with that node. For example, if an 8-bit wavelet coefficient has two leading zeros, then the coefficient has six significant bits and significance value 854 will have a value of six. Significance value of descendants 856 for a parent node represents the highest significance value 854 of any descendants of that parent node. For example, if it is determined for a parent node that the highest significance value 854 for one of its descendent nodes has a value of seven, then significance value of descendants 856 for that parent node will be assigned the value of seven. In a similar fashion, significance value of grandchildren 858 for a node represents the highest significance value 854 of any of the grandchildren and below for that node. In other words, significance values 854 are calculated for all grandchildren and below of a given node (excluding its children), and the highest value found is assigned to significance value of grandchildren 858 for the given node. Using this definition, it is realized that leaf nodes will only have significance values 854, those nodes one level up from the leaves will only have significance values 854 and 856, while any nodes higher will have all three values.

It should be appreciated that calculation of these three significance values 854, 856 and 858 for nodes in the zero trees may be performed in a variety of manners. In a referred embodiment, step 208 sweeps each tree from bottom to top calculating each of the three values for each node in question at once. In this way, the values are calculated in an efficient fashion and by the time the root of the zero tree has been reached, all three significance values have been calculated for all nodes in the tree. This calculation is performed for each of the zero trees in the array of zero trees.

SECOND PASS

FIGS. 4A–4D are a flowchart illustrating an embodiment of a procedure 500 useful for encoding and outputting the wavelet coefficients in one of the array of zero trees. It should be appreciated that procedure 400 is implemented in a similar fashion for each of the trees to encode their respective wavelet coefficients. The array of trees may be encoded in any suitable order; preferably, this order is known a priori by the decoder as well to facilitate decoding.

Block 502 provides brief descriptions of variables used in procedure 500. Variable A represents the current node, and in a specific implementation represents the address of the current node. The variable SIG(A) represents the number of significant bits in the wavelet coefficient associated with node A. In other words, variable SIG(A) represents the bit plane number of the most significant bit of node A. The variable L flag is true if and only if there is a significant descendent of a child of node A. The variable D.SIG(A) represents the significance value of the descendants of node A, while variable L.SIG(A) represents the significance value of the grandchildren and below of node A.

Block 504 is a looping construct that steps through each bit plane of the wavelet coefficients in the tree, one bit plane at a time. Preferably, the most significant bit plane is processed first and the least significant bit plane last. For example, for wavelet coefficients having eight bits, bit plane 7 would be processed first and bit plane 0 would be processed last. Once the last bit plane has been processed for the entire tree, procedure 500 ends.

Step 506 is an initialization step that sets the variable current node equal to the root of the tree. Step 508 is another initialization step that first clears the L flag stack and then initializes the L flag variable to true. The L flag stack is a stack data structure that stores values for the variable L flag and is used to help guide the tree walk. It guides the tree walk by noting when a node is determined as significant. Once a node is determined as significant, this information can be stored on the L flag stack and retrieved later. Advantageously, the significance of a node need not be computed each time a node is visited; the L flag stack stores this information.

Step 510 is a looping construct that operates to loop once through the below steps for each node visited in the tree until the tree walk returns to the root. Advantageously, it may not be necessary to visit each node in the tree. The following steps are performed only for those nodes that are actually visited, because portions of the tree may be clipped as described below. This clipping of subtrees greatly reduces the time required to perform procedure 500 and also results in a greater compression ratio. When the tree walk returns to the top of loop 510 via connector E, it is determined whether the tree walk up to this point has returned to the root node. If so, this indicates that processing of nodes for this bit plane has been completed and control returns to construct 504 to process the nodes in the tree for the next bit plane. However, if the current node is not the root, then the loop is performed again starting from the current node as indicated by connector B.

Step 512 determines whether the significance value of the current node is less than or equal to the current bit plane number. If not, this indicates that the bit at the current bit plane position is significant and should be output. Accordingly, in step 522 the bit for this significant wavelet coefficient for the current bit plane is output. If, however, the significance value is not greater than the bit plane number, then step 514 determines whether the significance value is equal to the current bit plane number. If so, this indicates that a first significance bit has been encountered (which may be a sign bit), and in step 518 a significance bit of "1" is output. In step 520 the sign bit for the wavelet coefficient is output. A "1" is output if the wavelet coefficient is positive and a "0" is output if the coefficient is negative. Then in step 522 the bit of the wavelet coefficient for the current bit plane is output as described above. If the significance value of the current node is less then the current bit plane number, this indicates that the bit at that position is not significant; in step 516 a significance bit of "0" is output, but the bit from the wavelet coefficient is not.

After either of steps 516 or 522 control moves to step 524 via connector C. Step 524 determines whether a child of the current node has a significant descendant. If not, this indicates that the subtree below the child may be "clipped" and ignored for this bit plane, and control moves via connector D to step 548. If a child of the current node does have a significant descendant, this indicates a branch of the zero tree to be explored and in step 526 the D flag is set equal to false indicating that it is currently unknown whether the current node has a significant child or not.

Next, step 528 tests whether the current node does in fact have a child. If so, in step 530 a navigation bit is output using the arguments D.SIG(A) and the current bit plane number. Outputting a navigation bit is described below in FIG. 5. The return value from the output navigation bit procedure is assigned to the variable D flag.

If step 528 determines that the current node does not have a child, then step 532 determines whether the current node has a significant child. If not, this indicates that one of the grandchildren nodes is significant and control moves via connector D to step 548. If, however, the current node does have a significant child, this indicates that the child nodes should be explored. The tree walk moves to the first child of the current node as indicated by step 534. Step 536 pushes the value of L flag onto the L flag stack, and step 538 sets L flag equal to 0.

Step 540 tests whether the current node has a grandchild (because any of the descendant node may be significant). If so, in step 542 a navigation bit is output using the arguments L.SIG(A) and the current bit plane number. The output navigation bit procedure is described below in FIG. 5. The return value from this procedure is assigned to the variable L flag. If the current node does not have a grandchild, in step 544 the tree walk moves to the first child of the current node. As indicated in step 546, this walk to the first child of the current node ends the walk down an arm (or a level) of the tree and control returns via connector E to looping construct 510 to determine whether to continue looping or not.

Step 548 tests whether the current node is the last child in a group of children nodes. In other words, step 548 is testing whether we have explored all the children of a parent node such that there are no more siblings. If so, in step 550 the tree walk continues by walking up to the parent of the current node. Step 552 determines whether the current node is the root. If so, step 554 indicates that this walk up the loop has ended and control moves via connector E to back to construct 510 in order to end the loop. If the current node is not the root, then step 556 pops the top value off of the L flag stack and assigns it to the variable L flag.

Returning to step 548, if the current node is not the last child, then step 558 determines whether the current node is the root. If so, step 560 indicates that this ends the walk to the next sibling arm of and control moves via connector E back to construct 510. If, however, step 558 determines that the current node is not the root, then the tree walk continues in step 562 by walking to the next sibling of the current node. After this step, block 564 indicates that next either the walk will end for this bit plane or the walk across the arm will continue. Control then moves via connector E back to construct 510.

Figure 5:
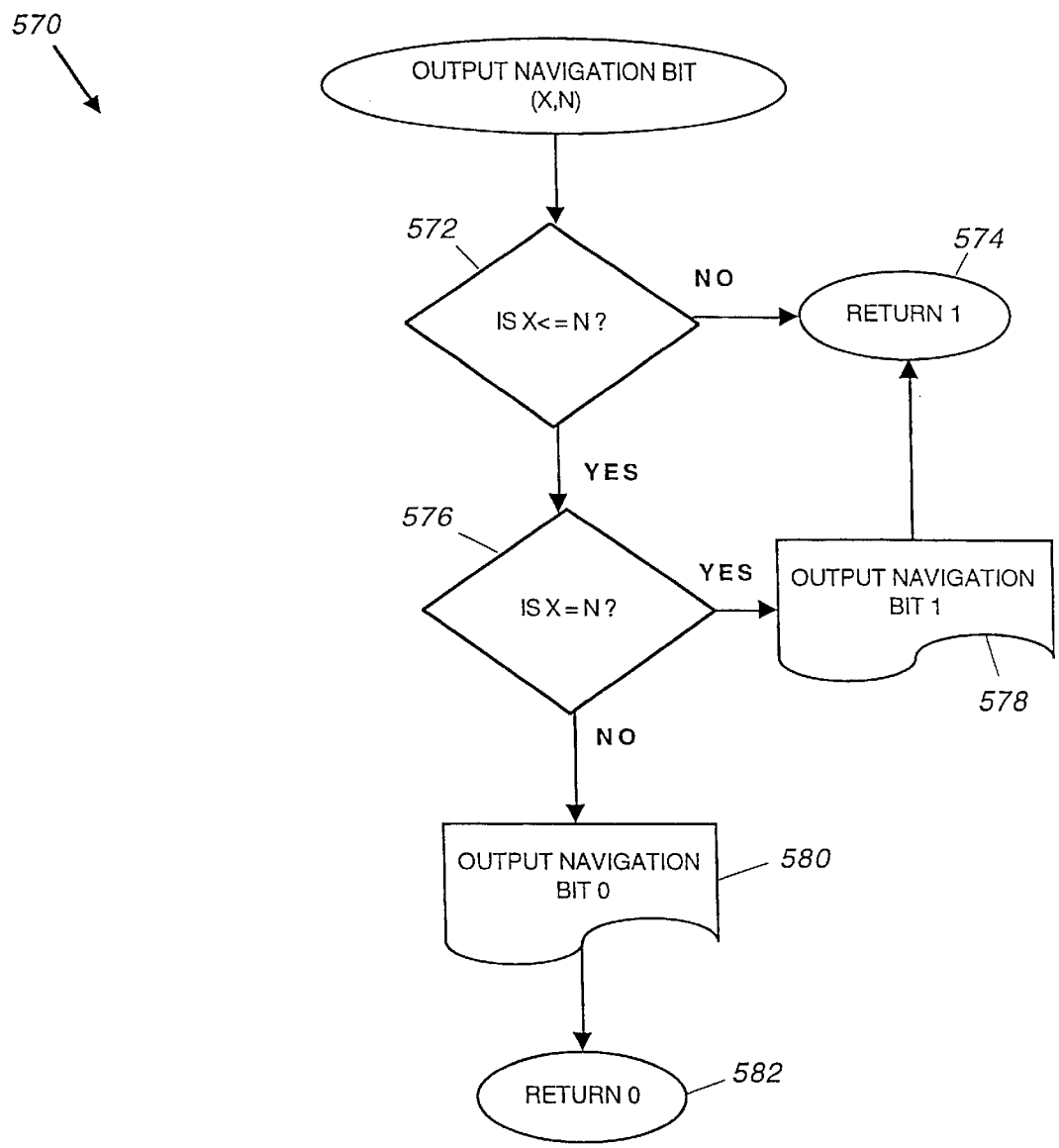
FIG. 5 is a flowchart illustrating a procedure by which a navigation bit is output and a value returned.

FIG. 5 is a flowchart illustrating a procedure 570 by which a navigation bit is output and a value returned. Procedure 570 accepts two arguments, an argument X which is either D.SIG (A) or L.SIG(A), and a value N which is the current bit plane number. Step 572 determines whether the value X is less than or equal to the value N. If not, then no bit is output and a value of "1" is returned in step 574. If so, step 576 determines whether the value of X is equal to the value of N. If so, then step 578 outputs a navigation bit "1" and a value of "1" is returned in step 574. If the value of X is less than the value of N, then in step 580 a navigation bit "0" is output and a value of "0" is returned in step 582.

DECOMPRESSION OF COMPRESSED IMAGES

Decompression of the output bit stream produced by the above encoding algorithm to produce original image 102 can be performed by reversing the above procedure as will be appreciated by those of skill in the art. In general (except for quantization), each of the above steps in FIGS. 3, 4A–4D, 5 are reversible. For example, the tree walk procedure of FIGS. 4A–4D is similar for the decode operation except bits are input where indicated as being output. Wavelet coefficients are built up bit plane by bit plane, and the significance values of nodes are known as bits are being input because the bit planes are processed most significant bit plane first, and so on. Modifications may also be introduced into decompression. For example, extra zeros or random noise may be introduced to compensate for quantization.

IMPROVED 2–6 BIORTHOGONAL FILTER

As explained above, any of a variety of filters may be used for transforming a field of information to produce a pyramid of wavelet coefficients. Preferably, a sequence of 2–6 Biorthogonal filters are used because of their desirable image processing features. More preferably, a sequence of improved 2–6 Biorthogonal filters are used to utilize only image values. Other filters that are longer than two coefficients require image values outside the actual image itself to calculate transform values near the boundary of the image. Using image values outside the actual image is undesirable because of the amount of RAM required. Image look-ahead is not a serious difficulty in the horizontal direction. However, in the vertical direction it may be necessary to look ahead 8×(k/2–1) scan lines (where k is the filter length), which is a potentially serious RAM problem. Implementation in hardware is made more difficult when image values outside the actual image must be used as part of the transform. A standard 2–6 Biorthogonal filter is known in the art; the improved 2–6 Biorthogonal filter that performs modified summing and differencing will now be explained with reference to FIGS. 7 and 8.

A standard 2–6 Biorthogonal filter can be thought of as a Haar transform in which summing and differencing of pairs of pixels are performed, followed by an additional lifting step. The lifting step changes the difference values by combing each difference with a linear combination of corresponding sum values. Advantageously, the present invention uses an improved 2–6 Biorthogonal filter with a unique linear combination for initial and final lifted differences of each image in order to allow images (or fields, etc.) to be processed independently. The below figures discuss processing of a field of information, although other units such as frames, blocks, stripes, etc., may be processed in a similar manner.

Figures 7, 8:
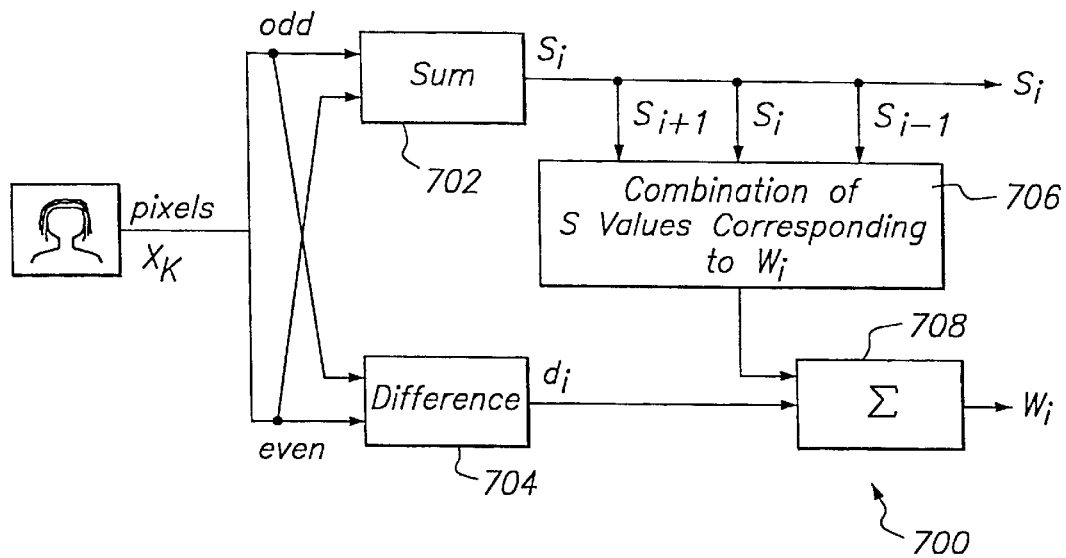
FIG. 7 illustrates one specific embodiment of a first stage of an improved 2–6 Biorthogonal filter.
FIG. 8 illustrates a table of coefficients for a combination unit of an improved 2–6 Biorthogonal filter.

FIG. 7 illustrates one specific embodiment of a first stage 700 of an improved 2–6 Biorthogonal filter. The second stage is preferably implemented in a similar manner. Filter 700 receives a stream of pixel values $x_k$ from a field of image 102 that are fed into sum unit 702 and difference unit 704. A combination unit 706 combines various sums with particular coefficients and adds the result to each difference $d_i$ in summation unit 708. The output from filter 700 is a stream of sums $s_i$ and a stream of lifted differences $w_i$.

Typically, a standard 2–6 Biorthogonal filter adjusts each difference to produce a lifted difference using the formula: $w_i = d_i - s_{i-1}/8 + s_{i+1}/8$. Thus, each difference has subtracted from it ⅛th of the previous sum and has added to it ⅛th of the following sum. In a standard 2–6 Biorthogonal filter, the actual sum corresponding to the difference being adjusted is not used to adjust the difference. Advantageously, the improved 2–6 Biorthogonal filter provides a unique combination from unit 706 of sum values in order to adjust each difference value without the need to rely upon values from outside the field.

FIG. 8 illustrates coefficients for combination unit 706 according to one specific embodiment of improved filter 700. To allow fields to be treated independently, the improved filter uses unique coefficients for sum values including a non-zero coefficient for the sum corresponding to the difference to be adjusted. More particularly, these unique coefficients are used for the very first and the very last lifted difference values of a field ($w_0$ and $w_{n-1}$). FIG. 8 shows a table of coefficients 709 used to implement combination unit 706. Table 709 includes columns of sums 710 and rows of lifted differences 712. Each cell of Table 709 represents the coefficient used for its corresponding sum in the calculation of a lifted difference. Rows 722 and 732 illustrate traditional coefficients in a standard 2–6 Biorthogonal filter. For example, lifted difference $w_1 = d_1 - s_0/8 + s_2/8$, etc.

Advantageously, Table 709 provides unique coefficient values for calculation of the first and last lifted difference values as shown in rows 720 and 734. In this specific embodiment, initial coefficients are $-3/8$, $1/2$ and $-1/8$, and thus the initial lifted difference $w_0=d_0-3s_0/8+s_1/2-s_2/8$. The final coefficients are $1/8$, $-1/2$ and $3/8$, and thus the final lifted difference $w_{n-1}=d_{n-1}+s_{n-3}/8-s_{n-2}/2+3s_{n-1}/8$. These unique coefficient values for the initial and last lifted difference of filter 700 allow each field to be treated independently by eliminating the zero, first and second moments.

PREFERRED EMBODIMENT

In one embodiment, the invention is implemented in software, and the software is organized into three basic components—input/output, wavelet transform and scaling, zerotree encoding and decoding. Of course, the invention may also be implemented in hardware using these components if suitable. Each of these components will be described below.

For compression, the codec expects bitmap images that are 24 bits deep. These images are transformed from their RGB color space into a different color space (presently Y, Cr, Cb) for compression. Presently, the chrominance components of this color space are half-sampled. That is, for every pair of adjacent Y or luminance values in a scan line there is one Cr and one Cb value. Depending on the size of the image, the codec can produce either an interlaced or progressive scan. For the largest image formats such as the 640×480 images discussed above, interlacing is applied and compression takes place independently on each field.

For decompression, the codec expects a data structure with the compressed image stored in a buffer member of the structure. The compressed data is decoded and inverse wavelet transformed into a buffer containing the three color space components of the image. The data in this buffer is then transformed from this half-chrominance sampled color space back into the RGB color space so that a 24-bit deep bitmap image is formed during decompression.

Wavelet transform and scaling are performed together. For each of the two 640×240 fields that comprise a 640×480 image the transform is applied five times horizontally and four times vertically. Following each horizontal-vertical pair of transforms the data is scaled. Currently, scaling appropriate to an $L_2$ norm is applied—namely division by 2. During decompression, the inverse process is applied—values are inflated by a factor of 2 and the inverse wavelet transforms are applied in the opposite order in which the forward transforms were applied. This results in an invertable process.

Zerotree encoding and decoding are performed using the tree walk described above. In general, for each frame to be compressed the number of zero trees to be encoded is equal to the number of wavelet coefficients in subband 1 (300 in the case of a 640×480 image). The loops in the zerotree encoding and decoding are folded in the following order: color space component, subband 1 root coefficient, bit plane. Sufficient bit planes are output so that a desired bit rate is not exceeded. During encode the significance, child significance and grandchild significance of each coefficient in the tree being encoded is first computed. Then these significance values are used to guide the tree walk for each bit plane. Navigation bits, leading zeros, sign bits and trailing ones and zeros are generated during this tree walk. A count of the bits generated by each bit plane is maintained so that the encoding may be terminated at the bit plane which results in a bit rate closest to but not exceeding the target bit rate. Storage requirements are minimized by encoding and decoding each zerotree rooted by a coefficient in subband 1 separately. In this way, it is only necessary to allocate storage for one such zero tree and the storage may be reused during the encoding and decoding of the other zero trees. Decoding is the opposite of encoding. Loops are again ordered color component, subband 1 root coefficient, bit plane and the bits read from the compressed bit stream guide the decoding tree walk. As the encode and decode processes are inverses of one another, if all bit planes are encoded one may recover the original wavelet coefficients without loss, Loss of data is introduced by the truncation of the bit planes generated.

By way of example, Appendices A, B, C, D and E provide computer code useful for implementing embodiments of zerotree encoding and decoding. Appendix A contains code in the Matlab language that corresponds to the flowcharts of FIGS. 4A–4D. Appendices B, C, D and E contain respectively pseudo code for implementing a recursive zerotree walk encode, a recursive zerotree walk decode, a non-recursive zerotree walk encode, and a non-recursive zerotree walk decode.

COMPUTER SYSTEM EMBODIMENT

Figure 12:
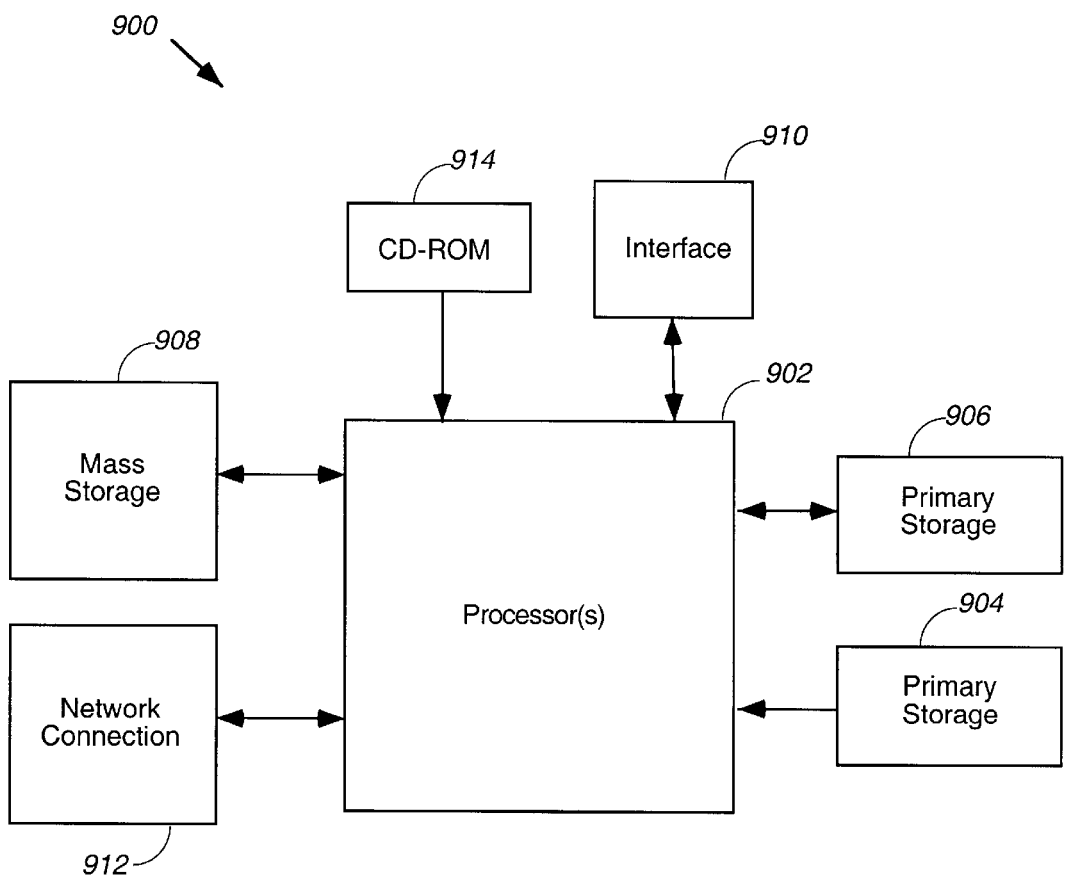
FIG. 12 is a block diagram of a typical computer system suitable for implementing an embodiment of the present invention.

FIG. 12 illustrates a computer system 900 suitable for implementing an embodiment of the present invention. Computer system 900 includes any number of processors 902 (also referred to as central processing units, or CPUs) that are coupled to storage devices including primary storage 906 (such as random access memory, or RAM) and primary storage 904 (such as a read only memory, or ROM). As is well known in the art, primary storage 904 acts to transfer data and instructions uni-directionally to the CPU and primary storage 906 is used typically to transfer data and instructions in a bi-directional manner. Both of these primary storage devices may include any suitable of the computer-readable media described below. A mass storage device 908 is also coupled bi-directionally to CPU 902 and provides additional data storage capacity and may also include any of the computer-readable media described below. Mass storage device 908 may be used to store programs, data and the like and is typically a secondary storage medium (such as a hard disk) that is slower than primary storage. It will be appreciated that the information retained within mass storage device 908, may, in appropriate cases, be incorporated in standard fashion as part of primary storage 906 as virtual memory. A specific mass storage device such as a CD-ROM 914 passes data uni-directionally to the CPU.

CPU 902 is also coupled to an interface 910 that includes one or more input/output devices such as such as video monitors, track balls, mice, keyboards, microphones, touch-sensitive displays, transducer card readers, magnetic or paper tape readers, tablets, styluses, voice or handwriting recognizers, biometrics readers, or other computers. CPU 902 optionally may be coupled to another computer or telecommunications network using a network connection as shown generally at 912. With such a network connection, it is contemplated that the CPU might receive information from the network, or might output information to the network in the course of performing the above-described method steps. Furthermore, method embodiments of the present invention may execute solely upon CPU 902 or may execute over a network connection such as the Internet in conjunction with a remote CPU that shares a portion of the processing.

In addition, embodiments of the present invention further relate to computer storage products with a computer readable medium that have program code thereon for performing various computer-implemented operations. The media and program code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as application-specific integrated circuits (ASICs), programmable logic devices (PLDs) and ROM and RAM devices. Examples of program code include machine code, such as produced by a compiler, and files containing higher level code that are executed by a computer using an interpreter.

Although the foregoing invention has been described in some detail for purposes of clarity of understanding, it will be apparent that certain changes and modifications may be practiced within the scope of the appended claims. For instance, the present invention is applicable to a wide variety of still images, video images and higher dimension data. For example, the present invention applies to two-dimensional still images, three-dimensional video images, and four-dimensional seismic information. In general, the present invention is useful for the compression and decompression of multi-dimensional information. Also, compression may be performed upon black/white information or color images. Further, the invention is suitable for implementation in a wide variety of integrated circuits and software languages. Any suitable wavelet transform may be used to construct a pyramid in which wavelet coefficients can be represented. Zero trees may be constructed from the pyramid in a variety of ways, and modifications of zero trees may also be used. In addition, although one specific technique for walking a zero tree has been shown, it should be appreciated that other, similar tree walks may also be used. Therefore, the described embodiments should be taken as illustrative and not restrictive, and the invention should not be limited to the details given herein but should be defined by the following claims and their full scope of equivalents.

APPENDIX A

```
function WalkOut(A)
%function WalkOut(A)
%
% depth first zerotree walk
% progressive encoding
% A is the address of the root node
% a is the address of the current node
% sig(a) gives the bit plane number of the most significant bit of a
% CodeOut(x, n) returns (x>=n) and if x<=n it outputs the bit (x==n)
% in the computation of L and D be careful not to CodeOut unnecessarily
global n a RCsig gamma D.sig L.sig;
true = 1; false = 0;
significant = 1; insignificant = 0;
for n = RC sig: -1: 1                                    %% loop from most
                                                         significant bit plane to least
                                                         significant bit plane
    a = A;                                               %% set current node to the
                                                         root
    Lstack=0; L = significant;                           %% clear the Lstack and
                                                         initialize L, L is true iff there
                                                         is a significant descendent of a
                                                         child of "a"
    while true                                           %% loop once for
                                                         each node walked in
                                                         the tree until we
                                                         return to the root
        sg = sig(a); if sg <= n, Output(sg==n); end;         %% output
                                                             significance bit
            if sg == n, OutputSign(a); end;                  %% output sign bit
            if sg >= n, OutputBit(a, n); end;                %% output significant
                                                             coefficient bit
        while true                                       %% Matlab's funky version
                                                         of a case statement - each
                                                         case statement arm breaks out
            if L;                                        %% Does a child of the
                                                         current node have a significant
                                                         descendent?
                D = false; if hasChild(a), D = CodeOut(D.sig, n); end;
                if D                                         %% Does the current
                                                             node have a significant
                                                             child? If so we
                                                             walk to the
                                                             first child
                    push(L, Lstack);                         %% push L onto
                                                             Lstack (coded as
                                                             Lstack = 2*Lstack+L;)
                    L = false; if hasGrandchild(a), L = CodeOut(L.sig, n); end;
                                                             %% compute L for the
                                                             children of a
                    a = firstChild(a);                       %% Walk to the first
                                                             child
```

APPENDIX A-continued

```
                break;                          %% end of the walk down
            end;                                   arm
        end;
                                                %% Nothing
                                                significant below - we
                                                walk to the next
                                                sibling, or if necessary
                                                up to the parent
        while lastChild(a)                      %% Is the current node the
                                                last child? No more
                                                siblings?
            a = parent(a);                      %% If so, walk up to the
                                                parent of the current node.
            if a==0, break, end;                %% If we've walked up to the
                                                root then end the
                                                walk up loop
            L = pop(Lstack);                    %% pop L off of Lstack
                                                (coded as L=rem(Lstack, 2);
                                                Lstack = (Lstack-L)/2;)
        end;
        if a==0, break, end;                    %% If we've walked up to the
                                                root then end the
                                                walk to next sibling arm
        a = nextChild(a);                       %% Otherwise walk to the
                                                next sibling of the current
                                                node
        break;                                  %% end of the walk next or
                                                up arm
    end;
    if a==0, break, end;                        %% If we are back at the root
                                                stop the walk and
                                                go to the next bit plane
  end;
end;
end
```

APPENDIX B

Write R.D.sig into the preamble
for each a pre-calculate a.sig. a.D.sig, and a.L.sig
for each n from R.D.sig step −1 until 0 do Walk(R)
Boolean Inline Procedure Output(Boolean: x)
   This procedure writes the Boolean argument and also returns it as the result
Boolean Inline Procedure CodeOut(x)
   if $x \leq n$ then Output(x=n)
   return $x \geq n$
Procedure Walk(a)
   for each b∈O(a) do if $\exists \gamma_b$ then
     set u:=(b.sig=n)
     if CodeOut(b.sig) then Output(if u then $\gamma_b$.sign else $\gamma_b[n]$)
   if CodeOut(a.L.sig) then
     for each b∈O(a) do if CodeOut(b.D.sig) then Walk(b)

APPENDIX C

Read R.D.sig from the preamble
for each a initialize a.sig. a.D.sig, and a.L.sig to 0
or each n from R.D.sig step −1 until 0 do Walk(R)
Boolean Inline Procedure Input
   This procedure reads and returns the next bit
Boolean Inline Procedure DecodeIn(x)
   if $x \leq n$ then if Input then set x:=n
   return $x \geq n$
Procedure Walk(a)
   for each b∈O(a) do if $\exists \gamma_b$ then
     set u:=(b.sig=0)
     if DecodeIn(b.sig) then set (if u then $\gamma_b$.sign else $\gamma_b[n]$):=Input
   if DecodeIn(a.L.sig) then
     for each b∈O(a) do if DecodeIn(b.D.sig) then Walk(b)

APPENDIX D

Boolean Inline Procedure Output(Boolean: x)
   This procedure writes the Boolean argument and also returns it as the result
Boolean Inline Procedure CodeOut(x)
   if $x \leq n$ then Output(x=n)
   return $x \geq n$
for each a precalculate a.sig. a.D.sig, and a.L.sig
set lim:=512
set Dlim:=lim/4
set Llim:=Dlim/4
Write R.D.sig into the preamble
for each n from R.D.sig step −1 until 0 do
   set a:=0
   set L:=0
   set l:=.true
   set w:=.true
   while w do
     set p:=(a.sig=n)
     if CodeOut(a.sig) then Output(if p then $\gamma_a$.sign else $\gamma_a[n]$)
     if l then if (if a<Dlim then CodeOut(a.D.sig) else false)then
       set L:=2L+l
       set l:=if a<Llim then CodeOut(a.L.sig) else false
       if a=0 then set a:=1 else set a:=4a
     else
       set a:=a+1
       if $a \geq$ lim then set w:=.false else

```
    while (a mod4)=0 do
        set a:=a/4
        set l:=(L mod 2) L:=(L-l)/2
```

APPENDIX E

Boolean Inline Procedure Input
  This procedure reads and returns the next bit
Boolean Inline Procedure DecodeIn(x)
  if x≦n then if Input then set x:=n
  return x≧n
for each a initialize a.sig. a.D.sig, and a.L.sig to -1
set lim:=512
set Dlim:=lim/4
set Llim:=Dlim/4
Read R.D.sig from the preamble
for each n from R.D.sig step -1 until 0 do
  set a:=0
  set L:=0
  set l:=.true
  set w:=.true
  while w do
    set p:=(a.sig=0)
    if DecodeIn(a.sig) then set (if p then $\gamma_a$.sign else $\gamma_a$[n]):=Input
    if l then if (if a<Dlim then DecodeIn(a.D.sig) else false)then
      set L:=2L+l
      set l:=if a<Llim then DecodeIn(a.L.sig) else false
      if a=0 then set a=1 else set a:=4a
    else
      set a:=a+1
      if a≧lim then set w:=.false else
        while (a mod4)=0 do
          set a:=a/4
          set l:=(L mod 2) L:=(L-l)/2

We claim:

1. A method of compressing video information comprising:
   receiving a portion of a video image;
   applying a wavelet transform to said portion, thereby producing wavelet coefficients representing said portion;
   representing said wavelet coefficients in at least one zero tree; and
   performing a tree walk of said at least one zero tree in place, encoding said wavelet coefficients at each node of the zero tree and outputting bits of said encoded wavelet coefficients continuously during said tree walk, whereby said portion of a video image is compressed.

2. A method as recited in claim 1 further comprising:
   calculating significance values for each node of said at least one zero tree to assist in said step of performing a tree walk, whereby nodes having a significance lower than a first predefined value are ignored during said tree walk.

3. A method as recited in claim 1 wherein said step of applying a wavelet transform includes the sub-step of:
   successively vertically and horizontally filtering said portion using an improved 2-6 Bi-orthogonal filter, whereby only values from said portion are required for said filtering and memory requirements are reduced.

4. A method as recited in claim 1 wherein said step of applying a wavelet transform produces a wavelet transform pyramid, and said step of representing said wavelet coefficients includes the sub-step of:
   representing said wavelet coefficients in a plurality of zero trees, each zero tree being rooted in a first subband of said wavelet transform pyramid.

5. An integrated circuit for compressing video information arranged to perform the following:
   receiving a portion of a video image;
   applying a wavelet transform to said portion, thereby producing wavelet coefficients representing said portion;
   representing said wavelet coefficients in at least one zero tree; and
   performing a tree walk of said at least one zero tree in place, encoding said wavelet coefficients at each node of the zero tree and outputting bits of said encoded wavelet coefficients continuously during said tree walk, whereby said portion of a video image is compressed.

6. An integrated circuit as recited in claim 5 being further arranged to perform the following:
   calculating significance values for each node of said at least one zero tree to assist in said step of performing a tree walk, whereby nodes having a significance lower than a first predefined value are ignored during said tree walk.

7. An integrated circuit as recited in claim 5 being further arranged to perform the following:
   successively vertically and horizontally filtering said portion using an improved 2-6 Bi-orthogonal filter, whereby only values from said portion are required for said filtering and memory requirements are reduced.

8. An integrated circuit as recited in claim 5 being further arranged to perform the following:
   producing a wavelet transform pyramid during said step of applying a wavelet transform; and
   representing said wavelet coefficients in a plurality of zero trees, each zero tree being rooted in a first subband of said wavelet transform pyramid.

9. An integrated circuit for compression of a video image, said integrated circuit comprising:
   a first pass buffer arranged to apply a wavelet transform to said video image, thereby producing wavelet coefficients representing said video image, said first pass buffer being further arranged to represent said wavelet coefficients in at least one zero tree; and
   a second pass buffer arranged to perform a tree walk of said at least one zero tree, encoding said wavelet coefficients at each node of the zero tree and outputting bits of said encoded wavelet coefficients continuously during said in place tree walk, whereby said video image is compressed.

10. An integrated circuit as recited in claim 9 further comprising:
    a filtering unit for successively vertically and horizontally filtering said video image using an improved 2-6 Bi-orthogonal filter, whereby only values from said video image are required for said filtering and memory requirements are reduced.

11. A method of compressing image information comprising:
    receiving a portion of an image;
    building a wavelet transform pyramid from said portion, thereby producing wavelet coefficients;
    organizing said wavelet coefficients into a tree structure; and
    performing a tree walk of said tree structure, encoding said wavelet coefficients at each node of the tree structure and outputting bits of said encoded wavelet coefficients continuously during said in place tree walk, whereby said portion of an image is compressed.

12. A method as recited in claim 11 wherein said tree structure is at least one zero tree.

13. A method as recited in claim 11 further comprising:

calculating significance values for each node of said tree structure to assist in said step of performing a tree walk, whereby nodes having a significance lower than a first predefined value are ignored during said tree walk.

14. A method as recited in claim 11 wherein said step of building a wavelet transform pyramid includes the sub-step of:

successively vertically and horizontally filtering said portion using an improved 2–6 Bi-orthogonal filter, whereby only values from said portion are required for said filtering and memory requirements are reduced.

15. A method as recited in claim 11 wherein said step of organizing said wavelet coefficients includes the sub-step of:

organizing said wavelet coefficients into a plurality of zero trees, each zero tree being rooted in a first subband of said wavelet transform pyramid.

16. An integrated circuit for compressing image information arranged to perform the following:

receiving a portion of an image;

building a wavelet transform pyramid from said portion, thereby producing wavelet coefficients;

organizing said wavelet coefficients into a tree structure; and performing a tree walk of said tree structure, encoding said wavelet coefficients at each node of the zero tree and outputting bits of said encoded wavelet coefficients continuously during said tree walk, whereby said portion of an image is compressed.

17. An integrated circuit as recited in claim 16 wherein said tree structure is at least one zero tree.

18. An integrated circuit as recited in claim 16 being further arranged to perform the following:

calculating significance values for each node of said tree structure to assist in said step of performing a tree walk, whereby nodes having a significance lower than a first predefined value are ignored during said tree walk.

19. An integrated circuit as recited in claim 16 being further arranged to perform the following:

successively vertically and horizontally filtering said portion using an improved 2–6 Bi-orthogonal filter, whereby only values from said portion are required for said filtering and memory requirements are reduced.

20. An integrated circuit as recited in claim 16 being further arranged to perform the following:

organizing said wavelet coefficients into a plurality of zero trees, each zero tree being rooted in a first subband of said wavelet transform pyramid.

21. A method of decompressing compressed video information comprising:

inputting encoded bits representing compressed video information and walking a zero tree based upon values of said encoded bits;

placing said bits into nodes of said zero tree continuously during said tree walk, thus forming wavelet coefficients in said nodes of said zero tree;

representing said wavelet coefficients from said zero tree in a wavelet transform pyramid; and applying a reverse wavelet transform to said wavelet coefficients in said wavelet transform pyramid, whereby decompressed video information is produced.

22. A method as recited in claim 21 wherein said step of applying a reverse wavelet transform includes the sub-step of:

successively vertically and horizontally reverse filtering said wavelet coefficients using an improved 2–6 Bi-orthogonal filter, whereby memory requirements are reduced.

23. A method as recited in claim 21 further comprising:

placing said bits into a plurality of zero trees, thus forming wavelet coefficients in nodes of said zero trees; and representing said wavelet coefficients from said zero trees in a wavelet transform pyramid, each zero tree being rooted in a first subband of said wavelet transform pyramid.

* * * * *